358-86. OR 3,244,809 SR

April 5, 1966 D. Q. FULLER ETAL 3,244,809

SIGNAL DISTRIBUTION SYSTEMS

Filed Feb. 26, 1962 2 Sheets-Sheet 1

T 5003

Inventors
DENNIS QUINTRELL FULLER,
KENNETH ALEXANDER RUSSELL
By
Holcomb, Wetherill & Brisebois
Attorneys

SIGNAL DISTRIBUTION SYSTEMS

Filed Feb. 26, 1962 2 Sheets-Sheet 2

Inventors
DENNIS QUINTRELL FULLER,
KENNETH ALEXANDER RUSSELL
By Holcomb, Wetherill & Brisebois
Attorneys United States Patent Office 3,244,809

Patented Apr. 5, 1966

3,244,809

SIGNAL DISTRIBUTION SYSTEMS

Dennis Quintrell Fuller, Cambridge, and Kenneth Alexander Russell, London, England, assignors to Pye Limited, Cambridge, England, a British company Filed Feb. 26, 1962, Ser. No. 175,416
Claims priority, application Great Britain, Mar. 1, 1961, 7,465/61
8 Claims. (Cl. 178—6)

Figure 1:
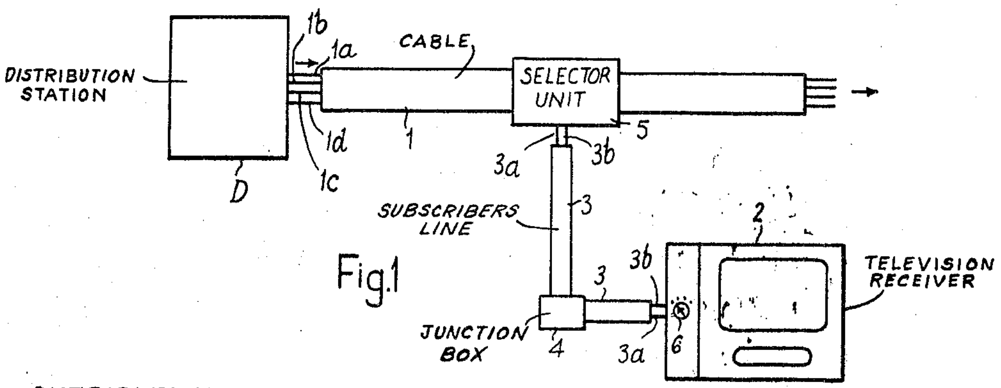

The present invention relates to signal distribution systems wherein signals to be distributed are fed over lines in the form of wires or cables from a distribution station to a plurality of subscribers receivers. Such systems are in use for the distribution of radio and television signals to subscribers and can of course also be used for the distribution of other signals.

In such systems as at present in use where plural signals are distributed from the distribution station so that the subscribers can select any one from amongst the plural signals distributed, all of the signals are routed to each subscribers receiver and the selection between the signals is made at or adjacent each receive. This is a disadvantage since it is necessary to provide sufficient conductors from the main distribution line to each subscribers receiver, or to a point adjacent to the receiver to carry all of the signals and balancing and screening of a high order is required between the conductors in order to prevent cross programme interference between the signals. This is difficult with the multi-way flexible leads and plug and socket connections generally employed. Furthermore special balancing circuits have to be incorporated in or adjacent each subscribers receiver. Moreover the signal level has to be considerably reduced at the connection of each subscribers line to the main distribution line in order to preserve the signal level and matching on the main distribution line.

It is an object of the present invention to provide an improved signal distribution system in which at least some of the aforementioned disadvantages are reduced or overcome.

According to the present invention, the selection of the desired signal or signals from amongst the plural alternative signals fed over the main distribution line is made by a selector device located at or adjacent the points where the line to each subscribers receiver is connected to the main distribution line. Thus it is only necessary for the line to each subscribers receiver from the main distribution line to have sufficient conductors to carry the selected signal or signals to the receiver and the risk of cross interference on the subscribers line is eliminated.

According to a feature of the invention, immediately after selection of the desired signal or signals these are amplified in order to improve the signal-to-noise ratio and reduce the effect of interference picked up by the line to the subscribers receiver. This amplification also reduces the gain actually required in each subscribers receiver.

Selection of the desired signal or signals from the main distribution line may be achieved by many different types of switching arrangements. For example, a mechanically operated rotary switch such as a uniselector may be employed or one or more solenoid operated relays or solenoid operated reed switches. Alternatively, electronic switching devices such as gas discharge tubes or semiconductor diode or transistor switches may be employed.

The system according to the present invention may be employed particularly in television distribution systems wherein subscribers require to receive both the vision and the sound signals of any one of a plurality of television programmes.

From another aspect therefore the invention consists in a television distribution system for distributing signals representing plural television programmes from a distribution station to a plurality of subscribers wherein at least the vision signals for each programme are transmitted over a separate pair of conductors of a distribution line and wherein the selection between the signals representing different programmes is made for each subscriber by means of a selecting device situated at or adjacent the point where the line from that subscribers receiver joins the main distribution line and the selected signals are also amplified at or adjacent that point and fed to the subscribers receiver over a cable having only sufficient conductors to carry the signals of any one of the television programmes which can be selected. The line from each subscribers receiver preferably also carries a potential or potentials to operate the selecting device. The main distribution line of the system may also include conductors for the distribution of separate sound programmes which can be fed to each subscribers receiver over the same conductors employed for feeding at least a part of the television signals.

The vision signals may be transmitted over the distribution line as a modulated carrier, a separate pair of conductors being provided for each programme, and each pair of conductors may also carry the associated audio signals for the television programme.

Figure 2:
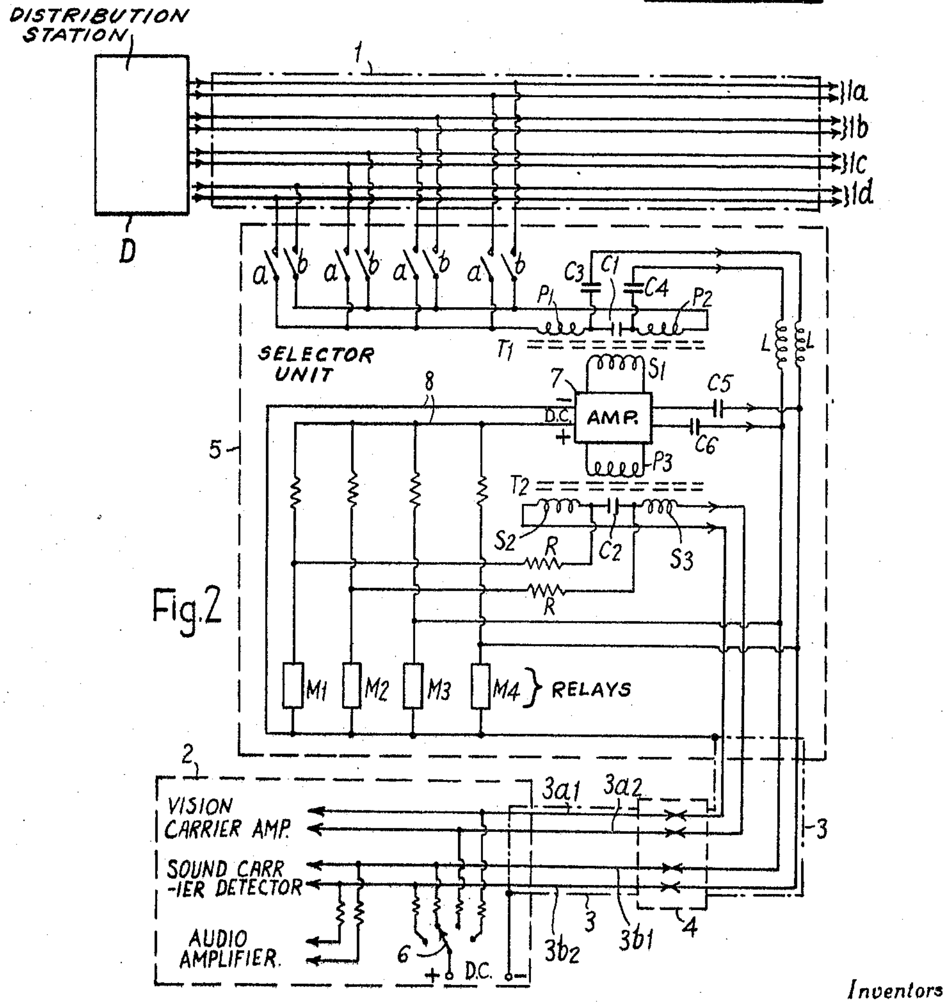
Figure 3:
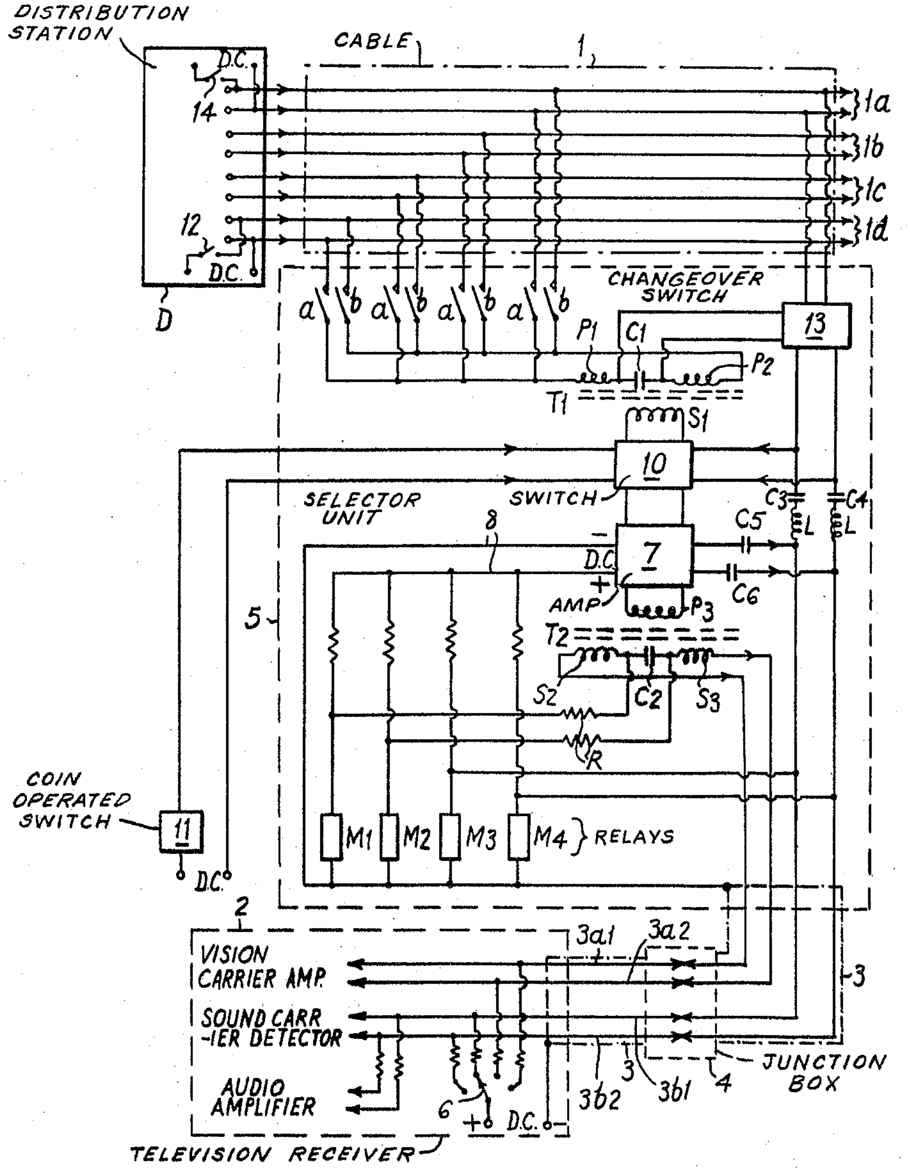

In order that the invention may be more fully understood reference will now be made to the accompanying drawings in which:

FIGURE 1 is a simplified diagram of part of a television signal distribution system according to this invention, FIGURE 2 is a circuit diagram of a practical embodiment of the arrangement shown in FIGURE 1, and FIGURE 3 is a circuit diagram of a further embodiment.

Referring to FIGURE 1, television signals are fed from a distribution station D over a main distribution line comprising a cable 1 having four signal paths *1a*, *1b*, *1c* and *1d*, each consisting of a pair of conductors for the distribution of the signals of a television programme. The vision signals are distributed as modulation on a carrier wave and the accompanying sound signals are transmitted at audio frequencies on the same pair of conductors. A subscribers television receiver is shown at 2 and is connected through a subscribers line 3 via a junction box 4 to a programme selector and amplifier unit 5 situated where the subscribers line is connected to the main distribution cable 1. The subscribers line 3 has two signal paths *3a* and *3b*, each consisting of a pair of conductors, one for the vision signals and the other for the sound signals. The unit 5 comprises a selecting device which is operated from the selector switch 6 on the subscribers receiver to selectively connect any one of the signal paths of the main distribution cable to the subscribers line. Operation of the selecting device is achieved by means of a D.C. potential fed over the subscribers line from the receiver and controlled by the switch 6. The unit 5 also comprises an amplifier, which advantageously is a transistor amplifier, for amplifying the selected signals immediately after they are selected from the main distribution cable and before they are fed over the subscribers line. Although only one subscribers receiver is shown, it will be obvious that the main distribution cable serves many receivers, each of which is connected to the main distribution cable in a similar manner to that described.

Referring now to FIGURE 2, the circuitry of one embodiment for carrying the present invention into effect is shown in greater detail. The subscribers line 3 comprises a four-conductor screened cable which is connected from the subscribers receiver 2 through the junction box 4 to the programme selector unit 5. This unit incorporates four relays M1 to M4, which may advantageously be solenoid operated reed switches, each having a pair of contacts *a* and *b* for selectively connecting any one of the four pairs of conductors 1*a*, 1*b*, 1*c* and 1*d* of the main distribution cable to the primary of a transformer T1. The primary of this transformer is in two parts P1 and P2 connected in series through a condenser C1, and the secondary S1 is connected to the input of a transistor amplifier 7. This amplifier has an output which feeds the primary P3 of an output transformer T2 the secondary of which is connected across the pair of conductors 3*a*1, 3*a*2 of the subscribers line. This secondary also consists of two portions S2, S3 connected in series through a condenser C2.

The programme selector switch 6 on the subscribers receiver constitutes a four way switch which can selectively feed a D.C. voltage over any one of the four conductors of the subscribers line and thereby energise any of the four relays. Thus when the voltage is applied to conductor 3*a*1, relay M1 is energised to connect conductors 1*d* to the receiver; when a voltage is applied to conductor 3*a*2, relay M2 is energised to connect conductors 1*c* to the receiver; when a voltage is applied to conductor 3*b*1, relay M3 is energised to connect conductors 1*b* to the receiver and when a voltage is applied to conductor 3*b*2 relay M4 is energised to connect conductors 1*a* to the receiver. The other pole of the D.C. voltage supply is permanently connected through the screen of the cable 3 to the other side of each of the relay energising coils and the D.C. supply is also fed to the transistor amplifier through the conductors 8.

As mentioned previously the vision signals are distributed as a modulated carrier frequency, and the audio signals are sent over the same conductors. Thus with the construction employed for transformers T1 and T2, the audio frequency signals passing through the two primary winding portions P1 and P2 of transformer T1 will be fed through condensers C3 and C4 to the conductors 3*b*1 and 3*b*2 and hence to the audio amplifier in receiver 2. The condenser C1 which offers a high impedance to the audio signals however offers a negligible impedance to the vision signals which pass through the transformer T1 to the transistor amplifier. The condenser C2 connected in series with two portions S2, S3 of the secondary of the transformer T2 also offers a negligible impedance to the vision signals so that these signals are then fed along conductors 3*a*1, 3*a*2 of the subscribers distribution line to the vision carrier amplifier of receiver 2. Condenser C2 acts as a D.C. blocking condenser for the D.C. fed to operate the relays.

The blocking resistors R and chokes L are to prevent loss of signal strength and the connections are taken from the centre of the windings of transformers T1 and T2 for the same reason.

It will be seen that with the arrangement described the subscribers line only carries the signals representing the selected programme plus the D.C. potentials for operating the selecting relays. The programme selector switch 6 in the subscribers receiver has only to route a D.C. voltage to the selector unit to operate the appropriate relay to select the desired programme.

In an alternative embodiment at least one of the pairs of conductors in the main distribution cable may carry the signals of a sound programme consisting of audio frequency modulated on a carrier. Such signals, when selected, would be amplified by the amplifier 7 and fed through condensers C5 and C6 to conductors 3*b*1 and 3*b*2 to the sound carrier detector in the receiver 2. In this case the subscribers receiver will include additional switch means to render the television section inoperative when the selector switch is at any on the sound broadcast positions, and vice versa.

FIGURE 3 is a diagram of a further embodiment of signal distribution system according to this invention. This embodiment is basically similar to the embodiment shown in FIGURE 2, and corresponding parts bear the same numerals, but the present embodiment also includes facilities for controlling the reception of at least one television programme by means of a coin operated switch, as well as facilities for the distribution station D to call or send messages to all subscribers.

In FIGURE 3 it is assumed that the programme transmitted over the pair of conductors 1*d* is only available to subscribers who pay a special subscription to receive this programme. To this end, the connection from transformer T1 to the amplifier 7 is made through a switch device 10 which is controlled by a coin operated switch 11, so that when the latter switch is operated a D.C. potential is applied to the switch device 10 to cause it to pass the signals fed over conductors 1*d* to a subscribers receiver. When the selecting device 5 is connected to conductors 1*d* and until the coin operated switch 11 is rendered operative by the insertion of an appropriate coin, the switch device 10 is held in operative by means of a D.C. potential fed over conductors 1*d* from the distribution station, through switch 12. The D.C. potential from the coin operated switch 11 over-rides the D.C. potential from the distribution station to operate the switch device 10 to pass the signals. It will be understood that the arrangement is such that when the selecting device device 5 is operative to connect the pairs of conductors 1*a*, 1*b* or 1*c* to the subscribers receiver, then the switch device 10 is not supplied with either the D.C. potential from the distribution station 9 or from the coin operated switch 11 and accordingly passes the signals fed over any of these pairs of conductors to the amplifier 7, as in the embodiment of FIGURE 2. The coin controlled mechanism can of course be applied to the reception of more than one television programme if desired.

The system shown in FIGURE 3 also includes a further change-over-switch device 13 which operates in conjunction with a D.C. potential fed from the distribution station, through switch 14, over the pair of conductors 1*a*, to enable the distribution station to send information to all subscribers who have their receivers switched on. When this D.C. potential is applied to the pair of conductors 1*a* at the distribution station, the change-over switch device 13 disconnects the lines 3*b*1 and 3*b*2 from the primary of transformer T1 and connects them directly to the pair of conductors 1*a*, enabling audio signals transmitted from the distribution station over these conductors to be fed directly to the audio circuits and loudspeaker of the subscribers receiver. Such a system enables special announcements to be made from the distribution station in order to call subscribers attention to a special programme, or for the issuing of emergency messages or news items.

Whilst particular embodiments have been described it will be understood that various modifications may be made without departing from the scope of this invention. Thus the main distribution cable may obviously carry either more or less signals than are specifically shown. Furthermore the selecting relays could be replaced by electronic devices such as diodes or transistors. The invention could also be employed in a system in which the audio signals of a television programme are distributed over separate conductors of the main cable to those carrying the vision signals. In such a case the selecting device would connect both sets of conductors to the subscribers distribution lines when such a programme was selected. Furthermore, the invention could also be employed in television distribution systems which transmit separate video and scanning signals.

We claim:

1. A signal distribution system for distributing plural different series of signals, comprising a distribution station, a plurality of subscribers receivers, a distribution line for distributing said series of signals from said distribution station towards said subscribers receivers, said distribution line having a separate conductor path for each series of signals, a signal selector device for each subscribers receiver, said signal selector devices all being located adjacent the distribution line, amplifying means in each signal selector device for amplifying the selected series of signals, a receiver line connecting each signal selector device to the associated subscribers receiver for feeding a series of signals selected by aid selector device from the distribution line to the receiver, each receiver line only having sufficient conductors to carry any one selected series of signals to the receiver connected thereto, and means for feeding a potential from each receiver over its receiver line to energise said amplifying means in the associated signal selector device.

2. A system as claimed in claim 1, in which said potential from each receiver also energises selecting switch means in each signal selector device.

3. A signal distribution system for distributing plural different series of signals representing television programmes, comprising a distribution station, a plurality of subscribers television receivers, a distribution line for distributing at least the vision signals of each programme from said distribution station towards said subscribers receivers, said distribution line having a separate conductor path for each series of vision signals, a signal selector device for each subscribers receiver, said signal selector devices all being located adjacent the distribution line, a receiver line connecting each signal selector device to the associated subscribers receiver for feeding a series of signals selected by said selector device from the distribution line to the receiver, each receiver line only having sufficient conductors to carry any one selected series of signals to the receiver connected thereto, and means for feeding a potential from each receiver over its receiver line to energise selecting switch means in each signal selector device.

4. A system as claimed in claim 3, including means for transmitting the vision signals of the different programmes over the conductor paths of the distribution line as a modulated carrier, each conductor path also carrying the associated audio signals for the television programme.

5. A system as claimed in claim 3, in which the main distribution line of the system also includes signal paths for the distribution of separate sound programmes which can be fed to each subscribers receiver over the same receiver line as that employed for feeding the television signals.

6. A signal distribution system for distributing plural different series of signals, comprising a distribution station, a plurality of subscribers receivers, a distribution line for distributing said series of signals from said distribution station towards said subscribers receivers, said distribution line having a separate conductor path for each series of signals, a signal selector device for each subscribers receiver, said signal selector devices all being located adjacent the distribution line, amplifying means in each signal selector device for amplifying the selected series of signals, a receiver line connecting each signal selector device to the associated subscribers receiver for feeding a series of signals selected by said selector device from the distribution line to the receiver, each receiver line only having sufficient conductors to carry any one selected series of signals to the receiver connected thereto, means for feeding a potential from each receiver over its receiver line to energise said amplifying means in the associated signal selector device, and solenoid operated selecting switch means in each signal selector device also energised by said potential fed over said receiver line.

7. A signal distribution system for distributing plural different series of signals representing television programmes, comprising a distribution station, a plurality of subscribers television receivers, a distribution line for distributing at least the vision signals of each programme from said distribution station towards said subscribers receivers, said distribution line having separate conductor path for each series of vision signals, a signal selector device for each subscribers receiver, said selector devices all being located adjacent the distribution line, amplifying means in each signal selector device for amplifying the selected signals, a receiver line connecting each signal selector device to the associated subscribers receiver for feeding a series of signals selected by said selector device from the distribution line to the receiver, each receiver line only having sufficient conductors to carry any one selected series of signals to the receiver connected thereto, and means for feeding a potential from each receiver over its receiver line to energise said amplifying means in the associated signal selector device.

8. A system as claimed in claim 7, in which the potential to the amplifying means is applied through a selector switch in the subscribers receiver which controls the selector device to select the programme to be reproduced by the receiver.

References Cited by the Examiner

UNITED STATES PATENTS

| | | | |
|---|---|---|---|
| 2,135,577 | 11/1938 | Herbst | 178—6 |
| 2,394,917 | 2/1946 | Kallmann | 178—6 |
| 2,815,440 | 12/1957 | Fletcher | 178—6 |
| 2,854,506 | 9/1958 | Pickles | 178—6 |

FOREIGN PATENTS

| | | |
|---|---|---|
| 773,195 | 4/1957 | Great Britain. |

DAVID G. REDINBAUGH, *Primary Examiner.*